US010901779B2

(12) United States Patent
Wen et al.

(10) Patent No.: US 10,901,779 B2
(45) Date of Patent: Jan. 26, 2021

(54) METHOD AND APPARATUS FOR SILENTLY STARTING APPLICATION IN BACKGROUND AND TERMINAL DEVICE

(71) Applicant: Huawei Technologies Co., Ltd., Shenzhen (CN)

(72) Inventors: Bailin Wen, Hangzhou (CN); Xicai Chen, Shenzhen (CN); Dingyu Lin, Changsha (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 16/351,011

(22) Filed: Mar. 12, 2019

(65) Prior Publication Data

US 2019/0205159 A1 Jul. 4, 2019

Related U.S. Application Data

(63) Continuation of application No. PCT/CN2017/100553, filed on Sep. 5, 2017.

(30) Foreign Application Priority Data

Sep. 12, 2016 (CN) .......................... 2016 1 0817836

(51) Int. Cl.
*G06F 9/46* (2006.01)
*G06F 9/48* (2006.01)
(Continued)

(52) U.S. Cl.
CPC .............. *G06F 9/485* (2013.01); *G06F 9/445* (2013.01); *G06F 9/505* (2013.01); *G06F 9/542* (2013.01); *G06F 9/451* (2018.02)

(58) Field of Classification Search
CPC ........... G06F 9/485; G06F 9/445; G06F 9/505
See application file for complete search history.

(56) References Cited

U.S. PATENT DOCUMENTS

2005/0229185 A1 10/2005 Stoops et al.
2006/0206587 A1 9/2006 Fabbrocino
(Continued)

FOREIGN PATENT DOCUMENTS

CN 103176842 A 6/2013
CN 103781057 A 5/2014
(Continued)

*Primary Examiner* — Camquy Truong
(74) *Attorney, Agent, or Firm* — Leydig, Voit & Mayer, Ltd.

(57) ABSTRACT

A method for silently starting an application in background includes: monitoring running statuses of applications on a terminal and when it is detected that a first application exits running, determining whether the first application is a silently started application; and if yes, intercepting prompt information for the first application, where the first application is any one of the applications on the terminal, and the silently started application is an application recorded in a silent application list. According to this method, the prompt information for the first application of the silently started application is intercepted, so that a problem that it takes an excessively long time to cold start an application and a problem of unnecessary interference caused by the prompt information to a user are resolved, thereby improving user experience.

9 Claims, 3 Drawing Sheets

(51) Int. Cl.
*G06F 9/445* (2018.01)
*G06F 9/50* (2006.01)
*G06F 9/54* (2006.01)
*G06F 9/451* (2018.01)

(56) References Cited

U.S. PATENT DOCUMENTS

| | | | |
|---|---|---|---|
| 2008/0148411 A1* | 6/2008 | Murakami | G06F 21/572 |
| | | | 726/26 |
| 2012/0246655 A1* | 9/2012 | Chaar | G06F 9/485 |
| | | | 718/102 |
| 2014/0372356 A1 | 12/2014 | Bilal et al. | |
| 2015/0350232 A1* | 12/2015 | Liu | H04L 43/0876 |
| | | | 726/23 |
| 2016/0054990 A1* | 2/2016 | Qin | H04L 67/34 |
| | | | 717/169 |

FOREIGN PATENT DOCUMENTS

| | | |
|---|---|---|
| CN | 104680060 A | 6/2015 |
| CN | 105045588 A | 11/2015 |
| CN | 105045637 A | 11/2015 |
| CN | 105095746 A | 11/2015 |
| CN | 105260247 A | 1/2016 |
| CN | 105260671 A | 1/2016 |
| CN | 105718284 A | 6/2016 |
| TW | 201232400 A | 8/2012 |

\* cited by examiner

METHOD AND APPARATUS FOR SILENTLY STARTING APPLICATION IN BACKGROUND AND TERMINAL DEVICE

CROSS-REFERENCE TO RELATED APPLICATIONS

This application is a continuation of International Application No. PCT/CN2017/100553, filed on Sep. 5, 2017, which claims priority to Chinese Patent 201610817836.X, filed on Sep. 12, 2016. The disclosures of the aforementioned applications are hereby incorporated by reference in their entireties.

TECHNICAL FIELD

The present disclosure relates to the field of communications technologies, and in particular, to a method for starting an application in background and a terminal device.

BACKGROUND

Android is a multitask system. In other words, Android can run a plurality of programs at the same time. Generally, it takes particular time overheads to start and run a program. Considering this, to accelerate a running speed, Android does not instantly "kill" a program that is exited, so that when the program is run again next time, the program can be rapidly started. As more programs are reserved in the system, a memory size is definitely insufficient. Low Memory Killer (LMK) is used to clear related application programs when the system memory size is less than a value, ensuring that the system maintains a particular amount of idle memory space.

The cleared application programs, when used again, are cold started instead of being hot started, and a start time is prolonged. For example, a start time of WeChat changes from 0.5 s to 2 s. Currently, a common method for increasing a cold start time of an application preloading a process of the application in background. When the application is used by a user next time, a start speed of the application can be accelerated. However, the following problem emerges: In a process of starting the application in the background, different types of prompt information, for example, a Toast, a permission selection box, a notification bar message, and a floating window occur, and user experience is affected.

SUMMARY

A method and an apparatus for silently starting an application in background and a terminal device provided in embodiments of the present disclosure are used to resolve, to some extent, a problem that it takes an excessively long time to cold start an application that is cleared in background of an Android system, thereby not only avoiding a cold start problem, but also avoiding a problem of interference caused by different types of prompt information to a user.

According to a first aspect, the present disclosure provides a method for silently starting an application in background, including:

monitoring running statuses of applications on a terminal; and when it is detected that a first application exits running, determining whether the first application is a silently started application; and if yes, intercepting prompt information for the first application, where the first application is any one of the applications on the terminal, and the silently started application is an application recorded in a silent application list.

The silently started application is an application that is restarted by a system in a manner not perceived by a user.

In this way, when system memory of an Android system is lower than a value, or when an Android system clears, due to other reasons, applications reserved to run in background, the method provided in this embodiment of the present disclosure can prevent the applications from being cleared. In this case, when the applications are restarted, the applications are not cold started and an excessively long start time is avoided, thereby improving user experience. Moreover, according to the solution provided in this embodiment of the present disclosure, prompt information for the application is intercepted when it is determined that the application is a silently started application, so that different types of prompt information do not pop up to divert attention of the user in a process of starting the application in the background, thereby improving overall user experience.

With reference to the first aspect, in a first possible implementation of the first aspect, before the determining whether the first application is a silently started application, and after the monitoring running statuses of applications on a terminal, the method further includes: obtaining, when it is detected that a second application exits running, a package name of the second application;

obtaining a process name of the second application based on the package name of the second application;

obtaining a process record of the second application based on the process name of the second application; and restarting the second application based on the process record of the second application, and recording the package name of the second application into the silent application list after the second application is successfully started, where the second application is any one of the applications on the terminal.

This implementation provides a generation process of the silent application list. That is, when it is detected that an application exits running, the foregoing steps are performed on the application, to generate a list of silent applications, or referred to as a silent application list. The silent application list is used in subsequent actions to "determine whether the first application is a silently started application". To be specific, when the first application is recorded in the silent application list, the first application is a silently started application, or when the first application is not recorded in the silent application list, the first application is not a silently started application. The generation process of the silent application list may be obtained in advance for later use, or may be updated in real time. This is not limited herein.

With reference to the first possible implementation of the first aspect, in a second possible implementation of the first aspect, the obtaining, when it is detected that a second application exits running, a package name of the second application includes:

when it is detected that the second application exits running, detecting whether CPU load of the terminal is less than a first preset threshold; if yes, detecting whether effective memory of the terminal is greater than a second preset threshold; and if yes, obtaining the package name of the second application.

With reference to any one of the first aspect, the first possible implementation of the first aspect, and the second possible implementation of the first aspect, in a third possible implementation of the first aspect, the prompt information for the first application includes one or more of the following information: a Toast toast, a permission selection box, notification bar information, and a floating window; and the intercepting prompt information for the first application includes:

intercepting different prompt information in the prompt information for the first application in different interception manners, where an interception manner for the Toast toast is: modifying an NMS (Notification Manager Service notification manager service) module and skipping creating a toast.

Specifically, the modifying an NMS module may be: modifying an import queue (enqueue Toast) function in the NMS module, so that the import queue function is directly returned without creating a toast.

An interception manner for the permission selection box is: directly skipping an AMS (Activity Manager Service activity manager service) module, and skipping displaying the permission selection box.

Specifically, the directly skipping an AMS module may be specifically: directly skipping a permission selection box popup function in the AMS module, so that the permission selection box is not displayed.

An interception manner for the notification bar information is: modifying the NMS module, and directly deleting the notification bar information.

Specifically, the modifying the NMS module may be specifically: modifying an import notification (enqueue Notification Internal) function in the NMS module, so that the notification bar information is directly deleted.

An interception manner for the floating window is: modifying a WMS (Window Manager Service window manager service) module, and setting a window of the floating window to be invisible.

Specifically, the modifying a WMS module may be specifically: modifying a window visibility (set Win And Children Visibility) function and an add window (Add Window) function in the WMS module, so that a window of the floating window is invisible.

Therefore, the prompt information for the first application is intercepted, so that different types of prompt information do not pop up to divert attention of the user in a process of starting the application in the background, thereby improving overall user experience.

With reference to the first possible implementation of the first aspect or the second possible implementation of the first aspect, in a fourth possible implementation of the first aspect, the obtaining a process name of the second application based on the package name of the second application includes:

obtaining information about the second application based on the package name of the second application, where the information about the second application includes: a version, a version number, a developer, and developer vendor information of the second application; and obtaining the process name of the second application based on the information about the second application.

According to a second aspect, an embodiment of the present disclosure provides an apparatus for silently starting an application in background, including:

a monitoring module, configured to monitor running statuses of applications on a terminal;

a prompt information interception module, configured to: when it is detected that a first application exits running, determine whether the first application is a silently started application;

and if yes, intercept prompt information for the first application, where the first application is any one of the applications on the terminal, and the silently started application is an application recorded in a silent application list.

The silently started application is an application that is restarted by a system in a manner not perceived by a user.

In this way, when system memory of an Android system is lower than a value, or when an Android system clears, due to other reasons, applications reserved to run in background, the apparatus provided in this embodiment of the present disclosure can prevent the applications from being cleared. In this case, when the applications are restarted, the applications are not cold started and an excessively long start time is avoided, thereby improving user experience. Moreover, according to the apparatus provided in this embodiment of the present disclosure, prompt information for the application is intercepted when it is determined that the application is a silently started application, so that different types of prompt information do not pop up to divert attention of the user in a process of starting the application in the background, thereby improving overall user experience.

With reference to the second aspect, in a first possible implementation of the second aspect, the apparatus further includes: a silent application list generation module, configured to:

obtain, when the monitoring module detects that a second application exits running, a package name of the second application;

obtain a process name of the second application based on the package name of the second application;

obtain a process record of the second application based on the process name of the second application; and restart the second application based on the process record of the second application, and record the package name of the second application into the silent application list after the second application is successfully started, where the second application is any one of the applications on the terminal.

In the apparatus provided in this embodiment of the present disclosure, the silent application list generation module implements a generation process of the silent application list. That is, when it is detected that an application exits running, the foregoing steps are performed on the application, to generate a list of silent applications, or referred to as a silent application list. The silent application list is used by the prompt information interception module to "determine whether the first application is a silently started application". To be specific, when the first application is recorded in the silent application list, the first application is a silently started application, or when the first application is not recorded in the silent application list, the first application is not a silently started application. The generation process of the silent application list may be obtained in advance for later use before the prompt information interception module performs the foregoing steps, or may be updated in real time. This is not limited herein.

With reference to the first possible implementation of the second aspect, in a second possible implementation of the second aspect, the silent application list generation module is further configured to:

when the monitoring module detects that the second application exits running, detect whether CPU load of the terminal is less than a first preset threshold; if yes, detect whether effective memory of the terminal is greater than a second preset threshold; and if yes, obtain the package name of the second application.

It should be noted that in a preferred implementation, the first preset threshold may be 60%, and the second preset threshold may be 800 M.

With reference to any one of the second aspect, the first possible implementation of the second aspect, and the second possible implementation of the second aspect, in a third possible implementation of the second aspect, the prompt information for the first application includes one or more of the following information: a Toast, a permission selection box, notification bar information, and a floating window; and the prompt information interception module is specifically configured to intercept different prompt information in the prompt information for the first application in different interception manners, where an interception manner for the Toast is: modifying an NMS (Notification Manager Service notification manager service) module and skipping creating a toast.

Specifically, the modifying an NMS module may be: modifying an import queue (enqueue Toast) function in the NMS module, so that the import queue function is directly returned without creating a toast.

An interception manner for the permission selection box is: directly skipping an AMS (Activity Manager Service activity manager service) module, and skipping displaying the permission selection box.

Specifically, the directly skipping an AMS module may be specifically: directly skipping a permission selection box popup function in the AMS module, so that the permission selection box is not displayed.

An interception manner for the notification bar information is: modifying the NMS module, and directly deleting the notification bar information.

Specifically, the modifying the NMS module may be specifically: modifying an import notification (enqueue Notification Internal) function in the NMS module, so that the notification bar information is directly deleted.

An interception manner for the floating window is: modifying a WMS (Window Manager Service window manager service) module, and setting a window of the floating window to be invisible.

Specifically, the modifying a WMS module may be specifically: modifying a window visibility (set Win And Children Visibility) function and an add window (Add Window) function in the WMS module, so that a window of the floating window is invisible.

Therefore, the prompt information for the first application is intercepted, so that different types of prompt information do not pop up to divert attention of the user in a process of starting the application in the background, thereby improving overall user experience.

With reference to the first possible implementation of the second aspect or the second possible implementation of the second aspect, in a fourth possible implementation of the second aspect, the silent application list generation module is further configured to:

obtain information about the second application based on the package name of the second application, where the information about the second application includes: a version, a version number, a developer, and developer vendor information of the second application; and obtain the process name of the second application based on the information about the second application.

According to a third aspect, an embodiment of the present disclosure provides a terminal device for silently starting an application in background, including a processor and a memory, where the processor is configured to: monitor running statuses of applications on a terminal; and when it is detected that a first application exits running, determine whether the first application is a silently started application; and if yes, intercept prompt information for the first application, where the first application is any one of the applications on the terminal, and the silently started application is an application recorded in a silent application list; and the memory is configured to store the silent application list.

The silently started application is an application that is restarted by a system in a manner not perceived by a user.

In this way, when system memory of an Android system is lower than a value, or when an Android system clears, due to other reasons, applications reserved to run in background, the terminal device provided in this embodiment of the present disclosure can prevent the applications from being cleared. In this case, when the applications are restarted, the applications are not cold started and an excessively long start time is avoided, thereby improving user experience. Moreover, according to the terminal device provided in this embodiment of the present disclosure, prompt information for the application is intercepted when it is determined that the application is a silently started application, so that different types of prompt information do not pop up to divert attention of the user in a process of starting the application in the background, thereby improving overall user experience.

With reference to the third aspect, in a first possible implementation of the third aspect, the processor is further configured to obtain, when it is detected that a second application exits running, a package name of the second application;

obtain a process name of the second application based on the package name of the second application;

obtain a process record of the second application based on the process name of the second application; and restart the second application based on the process record of the second application, and record the package name of the second application into the silent application list after the second application is successfully started, where the second application is any one of the applications on the terminal.

In the terminal device provided in this embodiment of the present disclosure, the processor implements a generation process of the silent application list. That is, when it is detected that an application exits running, the foregoing steps are performed on the application, to generate a list of silent applications, or referred to as a silent application list. The silent application list is used by the processor to "determine whether the first application is a silently started application". To be specific, when the first application is recorded in the silent application list, the first application is a silently started application, or when the first application is not recorded in the silent application list, the first application is not a silently started application. The generation process of the silent application list may be obtained in advance for later use, or may be updated in real time. This is not limited herein.

With reference to the first possible implementation of the third aspect, in a second possible implementation of the third aspect, the processor is specifically configured to: when it is detected that the second application exits running, detect whether CPU load of the terminal is less than a first preset threshold; if yes, detect whether effective memory of the terminal is greater than a second preset threshold; and if yes, obtain the package name of the second application.

It should be noted that in a preferred implementation, the first preset threshold may be 60%, and the second preset threshold may be 800 M.

With reference to any one of the third aspect, the first possible implementation of the third aspect, and the second possible implementation of the third aspect, in a third possible implementation of the third aspect, the prompt information for the first application includes one or more of the following information: a Toast, a permission selection box, notification bar information, and a floating window; and specifically, the processor is configured to intercept different prompt information in the prompt information for the first application in different interception manners, where an interception manner for the Toast is: modifying an NMS (Notification Manager Service notification manager service) module and skipping creating a toast.

Specifically, the modifying an NMS module may be: modifying an import queue (enqueue Toast) function in the NMS module, so that the import queue function is directly returned without creating a toast.

An interception manner for the permission selection box is: directly skipping an AMS (Activity Manager Service activity manager service) module, and skipping displaying the permission selection box.

Specifically, the directly skipping an AMS module may be specifically: directly skipping a permission selection box popup function in the AMS module, so that the permission selection box is not displayed.

An interception manner for the notification bar information is: modifying the NMS module, and directly deleting the notification bar information.

Specifically, the modifying the NMS module may be specifically: modifying an import notification (enqueue Notification Internal) function in the NMS module, so that the notification bar information is directly deleted.

An interception manner for the floating window is: modifying a WMS (Window Manager Service window manager service) module, and setting a window of the floating window to be invisible.

Specifically, the modifying a WMS module may be specifically: modifying a window visibility (set Win And Children Visibility) function and an add window (Add Window) function in the WMS module, so that a window of the floating window is invisible.

Therefore, the prompt information for the first application is intercepted, so that different types of prompt information do not pop up to divert attention of the user in a process of starting the application in the background, thereby improving overall user experience.

With reference to the first possible implementation of the third aspect or the second possible implementation of the third aspect, in a fourth possible implementation of the third aspect, the processor is specifically configured to:

obtain information about the second application based on the package name of the second application, where the information about the second application includes: a version, a version number, a developer, and developer vendor information of the second application; and obtain the process name of the second application based on the information about the second application.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

Figure 1:
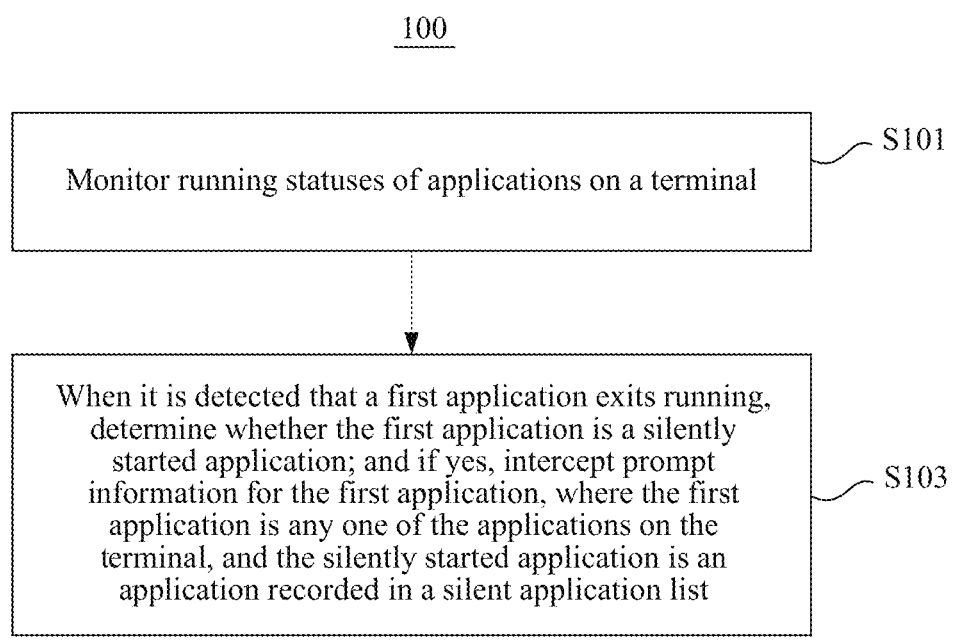
FIG. 1 is a flowchart of a method according to an embodiment of the present disclosure.

To make a person skilled in the art understand the technical solutions in the present disclosure better, the following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

Data structures and code described in the embodiments of the present disclosure are usually stored in a computer-readable storage medium. The computer-readable storage medium may be any device or medium that may store code and/or data to be used by a computer system. The computer-readable storage medium includes but is not limited to, a volatile memory, a non-volatile memory, a magnetic and optical storage device such as a disk drive, a magnetic tape, a CD (compact disc), and DVD (digital video disc), or other media that can store code and/or data.

Methods and processes described in the embodiments of the present disclosure may be implemented by using code and/or data, and the code and/or data may be stored in the computer-readable storage medium described above. When the computer system reads and runs the code and/or data stored in the computer-readable storage medium, the computer system can perform the methods and processes described in the embodiments of the present disclosure. In addition, the methods and processes described in the embodiments of the present disclosure may be included in hardware modules or apparatuses. The modules or apparatuses may include but are not limited to, an application-specific integrated circuit (ASIC) chip, a field programmable gate array (FPGA), a dedicated or shared processor that runs a particular software module or a segment of code at a particular time, and/or another programmable logic device. The hardware modules or apparatuses, when activated, perform the methods and processes included therein.

It should further be understood that, although terms first, second, and the like may be used in this specification to describe various elements, the terms are merely used to distinguish the elements from other related objects. For example, a first application may also be referred to as a second application, and similarly, a second application may also be referred to as a first application without departing from the scope of the present disclosure.

The terms used in the description of the present disclosure are merely for the purpose of illustrating specific embodiments, and are not intended to limit the present disclosure. The terms "a" and "the" of singular forms used in the specification and the appended claims of the present disclosure are also intended to include plural forms, unless otherwise specified in the context clearly. It should also be understood that, the term "and/or" used herein indicates and includes any or all possible combinations of one or more associated features.

FIG. 1 is a schematic flowchart of a method according to an embodiment of the present disclosure. The method 100 includes the following steps.

S101. Monitor running statuses of applications on a terminal.

S103. When it is detected that a first application exits running, determine whether the first application is a silently started application, and if yes, intercept prompt information for the first application, where the first application is any one of the applications on the terminal, and the silently started application is an application recorded in a silent application list.

The silently started application is an application that is restarted by a system in a manner not perceived by a user.

In this way, when system memory of an Android system is lower than a value, or when an Android system clears, due to other reasons, applications reserved to run in background, the method provided in this embodiment of the present disclosure can prevent the applications from being cleared. In this case, when the applications are restarted, the applications are not cold started and an excessively long start time is avoided, thereby improving user experience. Moreover, according to the solution provided in this embodiment of the present disclosure, prompt information for the application is intercepted when it is determined that the application is a silently started application, so that different types of prompt information do not pop up to divert attention of the user in a process of starting the application in the background, thereby improving overall user experience.

Based on the solution provided in the foregoing embodiment, an embodiment of the present disclosure further provides a method 200. The method 200 further includes S102 before S103 of "determining whether the first application is a silently started application", and after S101 of "monitoring running statuses of applications on a terminal". Specifically, S102 includes:

S1021. Obtain, when it is detected that a second application exits running, a package name of the second application.

S1022. Obtain a process name of the second application based on the package name of the second application.

S1023. Obtain a process record of the second application based on the process name of the second application.

S1024. Restart the second application based on the process record of the second application, and record the package name of the second application into the silent application list after the second application is successfully started, where the second application is any one of the applications on the terminal.

The method 200 in this embodiment of the present disclosure provides a generation process of the silent application list. That is, when it is detected that an application exits running, the foregoing steps S1021 to S1024 are performed on the application, to generate a list of silent applications, or referred to as a silent application list. The silent application list is used in a subsequent step S103 to "determine whether the first application is a silently started application". To be specific, when the first application is recorded in the silent application list, the first application is a silently started application, or when the first application is not recorded in the silent application list, the first application is not a silently started application. The generation process of the silent application list may be obtained in advance for later use before the entire method 100, or updated in real time. This is not limited herein.

It should be noted that, S1021 may be detailed as follows: When it is detected that the second application exits running, detecting whether CPU load of the terminal is less than a first preset threshold; if yes, further detecting whether effective memory of the terminal is greater than a second preset threshold; and if yes, obtaining the package name of the second application. In a preferred implementation, the first preset threshold may be 60%, and the second preset threshold may be 800 M.

In the foregoing embodiment provided in the present disclosure, optionally, the prompt information for the first application may include one or more of the following information: a Toast, a permission selection box, notification bar information, and a floating window; and correspondingly, the step S103 of "intercepting prompt information for the first application" includes:

intercepting different prompt information in the prompt information for the first application in different interception manners, where an interception manner for the Toast is: modifying an NMS (Notification Manager Service notification manager service) module and skipping creating a toast;

an interception manner for the permission selection box is: directly skipping an AMS (Activity Manager Service activity manager service) module, and skipping displaying the permission selection box;

an interception manner for the notification bar information is: modifying the NMS module, and directly deleting the notification bar information; and an interception manner for the floating window is: modifying a WMS (Window Manager Service window manager service) module, and setting a window of the floating window to be invisible.

Therefore, the prompt information for the first application is intercepted, so that different types of prompt information do not pop up to divert attention of the user in a process of starting the application in the background, thereby improving overall user experience.

In the foregoing embodiment provided in the present disclosure, optionally, the obtaining a process name of the second application based on the package name of the second application includes:

obtaining information about the second application based on the package name of the second application, where the information about the second application includes: a version, a version number, a developer, and developer vendor information of the second application; and obtaining the process name of the second application based on the information about the second application.

The following describes in detail related technical details by using an Android architecture as an example. A terminal device described in the embodiments of the present disclosure may be a mobile phone, a tablet computer, a portable media player, or another small-sized electronic device having a digital media function.

Figure 2:
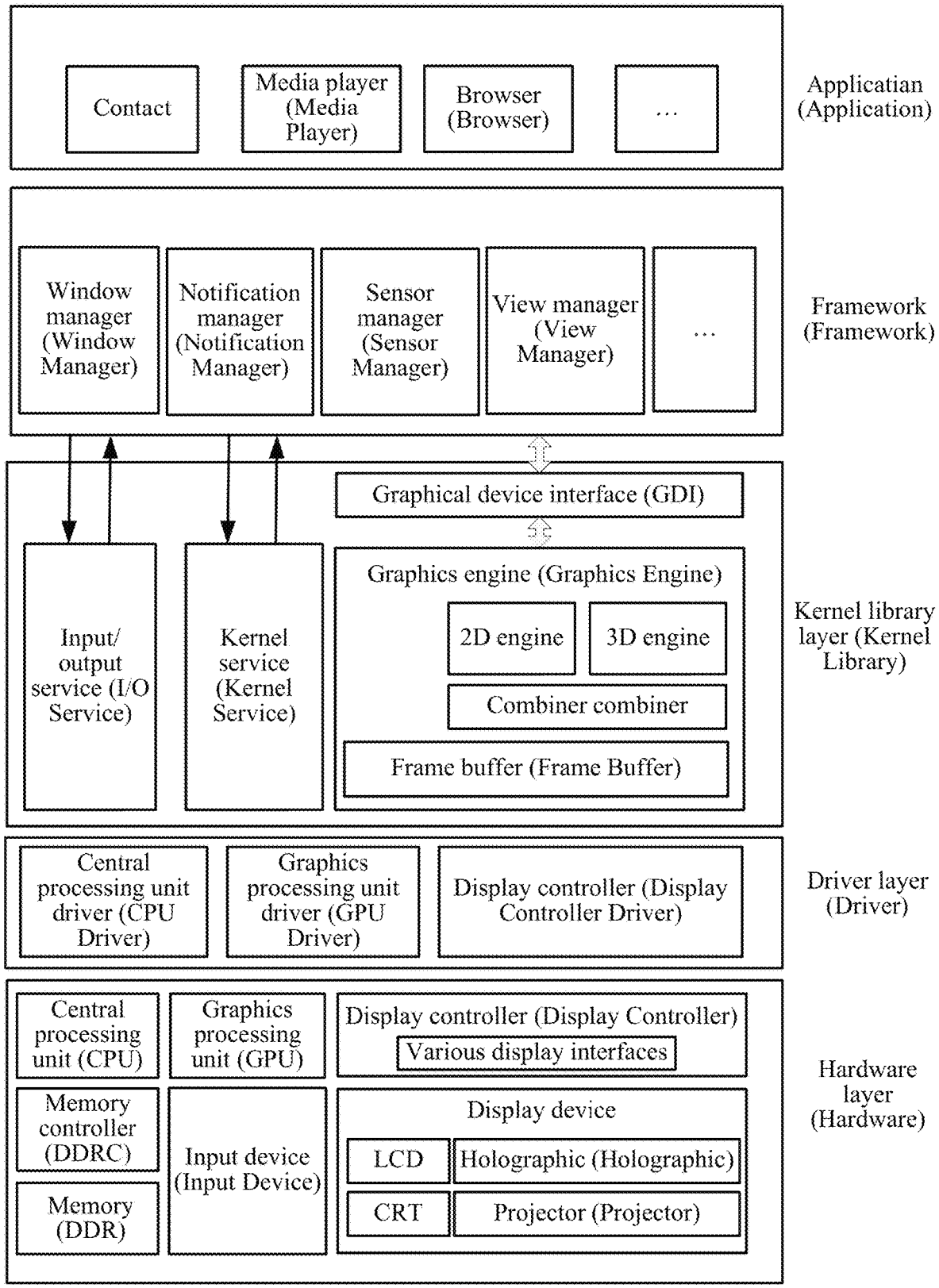
FIG. 2 is a diagram of a logical architecture of a terminal device according to an embodiment of the present disclosure.

FIG. 2 is a diagram of a logical architecture of a terminal device according to an embodiment of the present disclosure. Referring to FIG. 2, a hardware layer of the terminal device includes a central processing unit (Center Processing Unit, CPU), a graphics processing unit (Graphic Processing Unit, GPU), and the like. Certainly, the hardware layer may further include a storage, an input/output device, a memory, a memory controller, a network interface, and the like. The input device may include a keyboard, a mouse, a touchscreen, and the like. The output device may include a display device such as a liquid crystal display (Liquid Crystal Display, LCD), a cathode ray tube (Cathode Ray Tube, CRT), holographic (Holographic), and a projector (Projector). An operating system (such as Android and Firefox OS) and some application programs may be run on the hardware layer. The operating system includes a driver layer, a kernel library layer and a framework layer. The driver layer may include a CPU driver, a GPU driver, a display controller driver, and the like. A kernel library is a core part of an operating system, including an input/output service, a core service, a graphical device interface, and a graphics engine (Graphics Engine) that implements image processing by a CPU, a GPU, and the like. The graphics engine may include a 2D engine, a 3D engine, a combiner (Composition), a frame buffer (Frame Buffer), and the like. The framework layer may include a window manager (Window Manager), a notification manager (Notification Manager), a sensor manager (Sensor Manager), a view manager (View Manager), and the like. In addition, the host further includes an application layer. The application layer may include a desktop (launcher), a media player (Media Player), a browser (Browser), and the like.

In addition, the application layer may include various application programs such as a home (home) screen, a media player, and a browser.

Based on the logical architecture of the terminal device described above, the monitoring action described in S101 in this embodiment of the present disclosure is mainly used to: monitor application programs run on the hardware layer of user equipment; and when it is detected that an application exits running, further determine whether the application is a silently started application; and if yes, invoke hardware of the device to perform encoding, and modify a function in a corresponding module to intercept prompt information related to the application.

Figure 3:
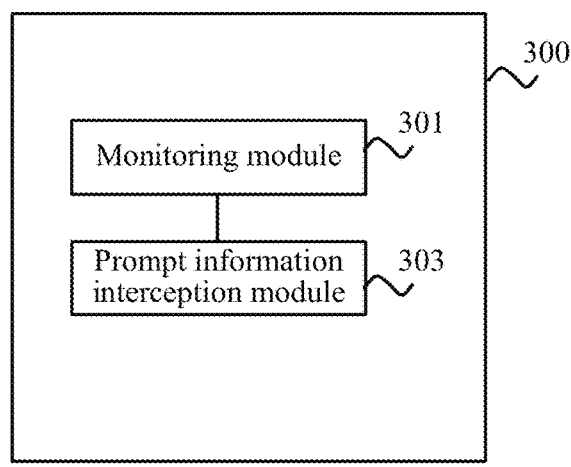
FIG. 3 is a structural diagram of an apparatus according to an embodiment of the present disclosure.

In another embodiment provided in the present disclosure, referring to FIG. 3, the monitoring function in S101 and the determining and interception function in S103 may be implemented by an apparatus 300. The apparatus 300 mainly includes: a monitoring module 301 and a prompt information interception module 303. The monitoring module 301 obtains application program data from an application layer, to monitor an application program. Specifically:

the monitoring module 301 is configured to monitor running statuses of applications on a terminal.

the prompt information interception module 303 is configured to: when it is detected that a first application exits running, determine whether the first application is a silently started application; and if yes, intercept prompt information for the first application, where the first application is any one of the applications on the terminal, and the silently started application is an application recorded in a silent application list.

The silently started application is an application that is restarted by a system in a manner not perceived by a user.

In this way, when system memory of an Android system is lower than a value, or when an Android system clears, due to other reasons, applications reserved to run in background, the apparatus provided in this embodiment of the present disclosure can prevent the applications from being cleared. In this case, when the applications are restarted, the applications are not cold started and an excessively long start time is avoided, thereby improving user experience. Moreover, according to the apparatus provided in this embodiment of the present disclosure, prompt information for the application is intercepted when it is determined that the application is a silently started application, so that different types of prompt information do not pop up to divert attention of the user in a process of starting the application in the background, thereby improving overall user experience.

Based on the apparatus provided in the foregoing embodiment, an embodiment of the present disclosure further provides another apparatus. Based on the apparatus 300, the apparatus further includes: a silent application list generation module 305. Specifically, the silent application list generation module 305 is configured to:

obtain, when the monitoring module detects that a second application exits running, a package name of the second application;

obtain a process name of the second application based on the package name of the second application;

obtain a process record of the second application based on the process name of the second application; and restart the second application based on the process record of the second application, and record the package name of the second application into the silent application list after the second application is successfully started, where the second application is any one of the applications on the terminal.

In the apparatus provided in this embodiment of the present disclosure, the silent application list generation module 305 implements a generation process of the silent application list. That is, when it is detected that an application exits running, the foregoing steps are performed on the application, to generate a list of silent applications, or referred to as a silent application list. The silent application list is used by the prompt information interception module 303 to "determine whether the first application is a silently started application". To be specific, when the first application is recorded in the silent application list, the first application is a silently started application, or when the first application is not recorded in the silent application list, the first application is not a silently started application. The generation process of the silent application list may be obtained in advance for later use before the prompt information interception module 303 performs the foregoing step, or may be updated in real time. This is not limited herein.

Further optionally, the silent application list generation module 305 may be specifically configured to: when it is detected that the second application exits running, detect whether CPU load of the terminal is less than a first preset threshold; if yes, further detect whether effective memory of the terminal is greater than a second preset threshold; and if yes, obtain the package name of the second application. In a preferred implementation, the first preset threshold may be 60%, and the second preset threshold may be 800 M.

In the foregoing embodiment provided in the present disclosure, optionally, the prompt information for the first application includes one or more of the following information: a Toast, a permission selection box, notification bar information, and a floating window; and the prompt information interception module 303 is specifically configured to intercept different prompt information in the prompt information for the first application in different interception manners, where an interception manner for the Toast is: modifying an NMS (Notification Manager Service notification manager service) module and skipping creating a toast;

an interception manner for the permission selection box is: directly skipping an AMS (Activity Manager Service activity manager service) module, and skipping displaying the permission selection box;

an interception manner for the notification bar information is: modifying the NMS module, and directly deleting the notification bar information; and an interception manner for the floating window is: modifying a WMS (Window Manager Service window manager service) module, and setting a window of the floating window to be invisible.

Therefore, the prompt information for the first application is intercepted, so that different types of prompt information do not pop up to divert attention of the user in a process of starting the application in the background, thereby improving overall user experience.

In the foregoing embodiment provided in the present disclosure, optionally, the silent application list generation module 305 is further configured to:

obtain information about the second application based on the package name of the second application, where the information about the second application includes: a version, a version number, a developer, and developer vendor information of the second application; and obtain the process name of the second application based on the information about the second application.

Figure 4:
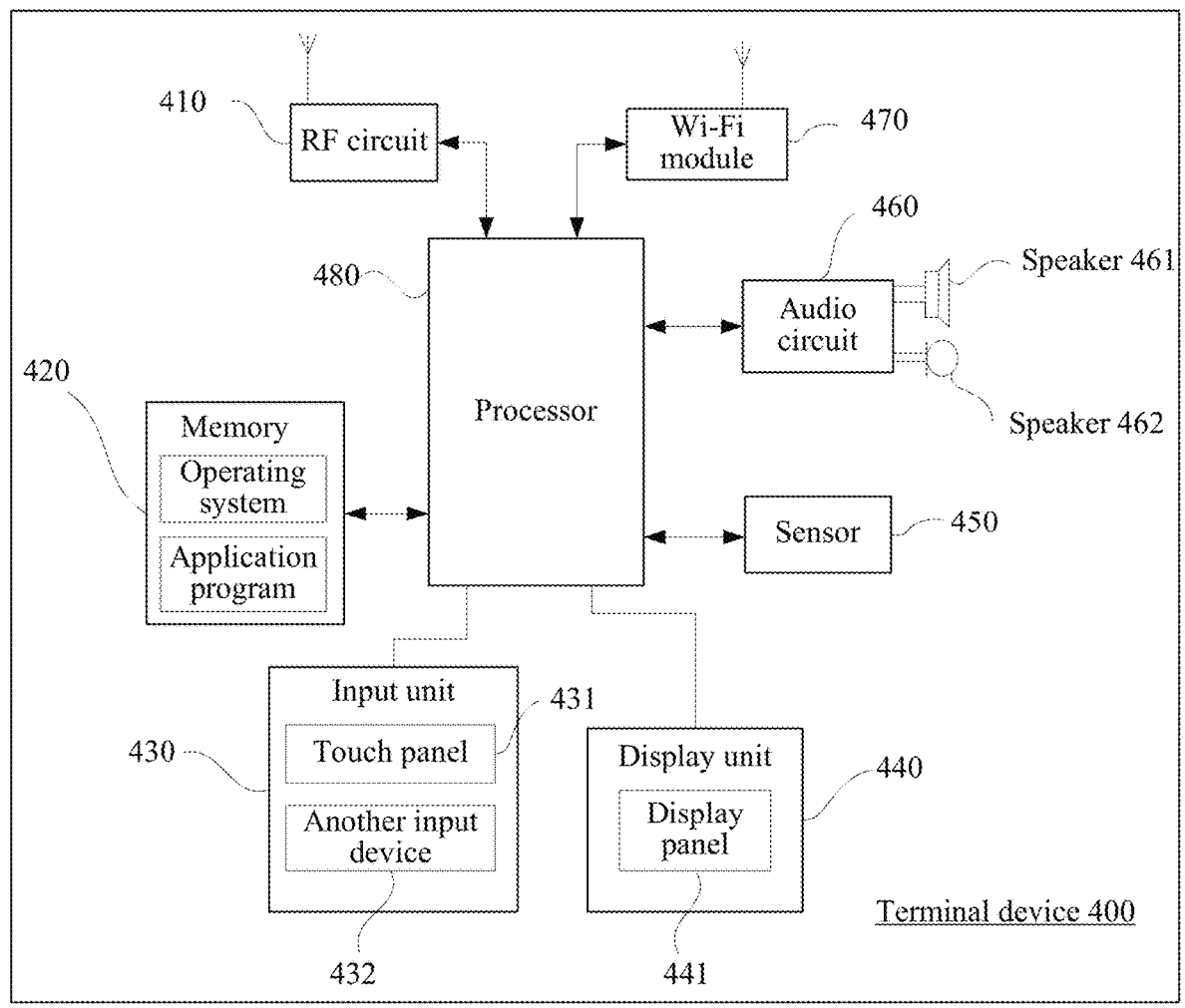
FIG. 4 is a structural diagram of hardware of a terminal device according to an embodiment of the present disclosure.

In still another embodiment provided in the present disclosure, referring to FIG. 4, a monitoring function in S101 and a determining and interception function in S103 may be implemented by a terminal device 400. The terminal device 400 includes components such as a radio frequency (Radio Frequency, RF) circuit 410, a memory 420, an input unit 430, a display unit 440, a sensor 450, an audio circuit 460, a wireless fidelity (WiFi) module 470, a processor 480, and a power supply 490. It may be understood by a person skilled in the art that the structure of the terminal device shown in FIG. 4 does not constitute a limitation on the terminal device, and the terminal device may include more or fewer components than those shown in the figure, or some components may be combined, or a different component deployment may be used.

The following specifically describes the components of the terminal device 400 with reference to FIG. 4.

The RF circuit 410 may be configured to receive and send signals in an information receiving and sending process or a call process. Particularly, the RF circuit 410 receives downlink information from a base station, delivers the downlink information to the processor 480 for processing, and additionally sends uplink data to the base station. Usually, the RF circuit 410 includes but is not limited to an antenna, at least one amplifier, a transceiver, a coupler, and the like. In addition, the RF circuit 410 may also communicate with a network and another device through wireless communication. The wireless communication may use any communication standard or protocol, which includes, but is not limited to, a Global System for Mobile Communications (GSM), General Packet Radio Service (GPRS), Code Division Multiple Access (CDMA), Wideband Code Division Multiple Access (WCDMA), Long Term Evolution (LTE), an email, a short messaging service (SMS), and the like.

The memory 420 may be configured to store an operating system and an application program. The processor 480 runs the application program and the operating system stored in the memory 420 to invoke a hardware resource to perform various functions and data processing. Specifically, the processor 480 may perform the application program and the operating system stored in the memory 420 to perform the method steps described in FIG. 1, to implement corresponding functions. In addition, the memory 420 may include a high speed random access memory, and may further include a nonvolatile memory, such as at least one magnetic disk storage device, a flash memory device, or another volatile solid-state storage device.

The input unit 430 may be configured to receive input digit or character information, and generate a key signal input related to a user setting and function control of a mobile device. Specifically, the input unit 430 may include a touch panel 431 and another input device 432. The touch panel 431, also referred to as a touchscreen, may collect a touch operation of a user on or near the touch panel (such as an operation of a user on or near the touch panel 431 by using any suitable object or attachment, such as a finger or a touch pen). In addition to the touch panel 431, the input unit 430 may further include the another input device 432. Specifically, the another input device 432 may include, but is not limited to, one or more of a physical keyboard, a functional key (such as a volume control key or a switch key), a trackball, a mouse, and a joystick.

The display unit 440 may be configured to display a system desktop or a graphical interface of an application program. The display unit 440 may include a display panel 441. Optionally, the display unit 640 may be in a type of a liquid crystal display (LCD), an organic lighting-emitting diode (OLED), and the like. Further, the touch panel 431 may cover the display panel 441. After detecting a touch operation on or near the touch panel 431, the touch panel 431 transfers a touch event to the processor 480, to determine a type of the touch event. Then, the processor 480 provides a corresponding visual output on the display panel 441 according to the type of the touch event, for example, updates a graphical interface currently displayed on the application program. Although, in FIG. 4, the touch panel 431 and the display panel 441 are used as two separate parts to implement input and output functions of the mobile device, in some embodiments, the touch panel 431 and the display panel 441 may be integrated to implement the input and output functions of the mobile device.

The terminal device 400 may further include at least one sensor 450 such as an optical sensor, a motion sensor, and another sensor. As to other sensors such as a gyroscope, a barometer, a hygrometer, a thermometer, and an infrared sensor that may be further configured on the terminal device, details are not repeatedly described herein.

The audio circuit 460, a speaker 461, and a microphone 462 may provide an audio interface between a user and the terminal device. The audio circuit 460 may transmit an electrical signal, which is converted from received audio data, to the speaker 461. The speaker 461 converts the electrical signal into a sound signal and outputs the sound signal. On the other hand, the microphone 462 converts a collected sound signal into an electrical signal. After receiving the electrical signal, the audio circuit 460 converts the electrical signal into audio data, and then outputs the audio data. After being processed by the processor 480, the audio data is sent through the RF circuit 410 to another user equipment or the audio data is output to the memory 420 for further processing.

Wi-Fi belongs to a short-distance wireless transmission technology. Although FIG. 4 shows a Wi-Fi module 470, it may be understood that the Wi-Fi module 470 is not a necessary constitution of the mobile device and may totally be neglected as required or replaced with another communications module.

The processor 480 is a control center of the terminal device 400, connects components of the entire terminal device by using various interface and buses, and performs various functions of the terminal device by running the operating system and the application program stored in the memory 420. Although not shown in the figure, the terminal device 400 may further include a camera, a Bluetooth module, and the like, which are not further described herein.

Based on the description of the components of the terminal device 400, the following describes in detail how the terminal device 400 is specifically applied to silently start an application in background. The processor 480 is configured to: monitor running statuses of applications on a terminal; and when it is detected that a first application exits running, determine whether the first application is a silently started application; and if yes, intercept prompt information for the first application, where the first application is any one of the applications on the terminal, and the silently started application is an application recorded in a silent application list.

The memory 420 is configured to store the silent application list.

The silently started application is an application that is restarted by a system in a manner not perceived by a user.

In this way, when system memory of an Android system is lower than a value, or when an Android system clears, due to other reasons, applications reserved to run in background, the terminal device provided in this embodiment of the present disclosure can prevent the applications from being cleared. In this case, when the applications are restarted, the applications are not cold started and an excessively long start time is avoided, thereby improving user experience. Moreover, according to the terminal device provided in this embodiment of the present disclosure, prompt information for the application is intercepted when it is determined that the application is a silently started application, so that different types of prompt information do not pop up to divert attention of the user in a process of starting the application in the background, thereby improving overall user experience.

Based on the terminal device provided in the foregoing embodiment, further, the processor 480 of the terminal device 400 is further configured to:

obtain, when it is detected that a second application exits running, a package name of the second application;

obtain a process name of the second application based on the package name of the second application;

obtain a process record of the second application based on the process name of the second application; and restart the second application based on the process record of the second application, and record the package name of the second application into the silent application list after the second application is successfully started, where the second application is any one of the applications on the terminal.

In the terminal device provided in this embodiment of the present disclosure, the processor 480 implements a generation process of the silent application list. That is, when it is detected that an application exits running, the foregoing steps are performed on the application, to generate a list of silent applications, or referred to as a silent application list. The silent application list is used by the processor 480 to "determine whether the first application is a silently started application". To be specific, when the first application is recorded in the silent application list, the first application is a silently started application, or when the first application is not recorded in the silent application list, the first application is not a silently started application. The generation process of the silent application list may be obtained in advance for later use, or may be updated in real time. This is not limited herein.

Further, optionally, the processor 480 may be specifically configured to: when it is detected that the second application on the terminal device exits running, detect whether CPU load of the terminal is less than a first preset threshold; if yes, detect whether effective memory of the terminal is greater than a second preset threshold; and if yes, obtain the package name of the second application. In a preferred implementation, the first preset threshold may be 60%, and the second preset threshold may be 800 M.

In the foregoing embodiment provided in the present disclosure, optionally, the prompt information for the first application includes one or more of the following information: a Toast, a permission selection box, notification bar information, and a floating window; and the processor 480 is specifically configured to intercept different prompt information in the prompt information for the first application in different interception manners, where an interception manner for the Toast toast is: modifying an NMS (Notification Manager Service notification manager service) module and skipping creating a toast;

an interception manner for the permission selection box is: directly skipping an AMS (Activity Manager Service activity manager service) module, and skipping displaying the permission selection box;

an interception manner for the notification bar information is: modifying the NMS module, and directly deleting the notification bar information; and an interception manner for the floating window is: modifying a WMS (Window Manager Service window manager service) module, and setting a window of the floating window to be invisible.

Therefore, the prompt information for the first application is intercepted, so that different types of prompt information do not pop up to divert attention of the user in a process of starting the application in the background, thereby improving overall user experience.

In the foregoing embodiment provided in the present disclosure, optionally, the processor 480 is further specifically configured to:

obtain information about the second application based on the package name of the second application, where the information about the second application includes: a version, a version number, a developer, and developer vendor information of the second application; and obtain the process name of the second application based on the information about the second application.

The method and apparatus for silently starting an application in background and the terminal device provided in the embodiments of the present disclosure are described above in detail. Although the principles and implementations of the present disclosure are described by using specific examples in this specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation on the present disclosure.

What is claimed is:

1. A method for silently starting an application in the background of a terminal, comprising:

monitoring a run status of a plurality of applications on the terminal; and determining, when it is detected that a first application stops running, whether the first application is a silently started application;

intercepting prompt information for the first application, wherein the silently started application is an application recorded in a silent application list, wherein the prompt information for the first application comprises one or more of the following information: a toast, a permission selection box, notification bar information, and a floating window; and the intercepting prompt information for the first application comprises:

intercepting different prompt information in the prompt information for the first application in different interception manners, wherein an interception manner for the toast is: modifying an Notification Manager Service (NMS) module and skipping creating the Toast;

an interception manner for the permission selection box is: directly skipping an Activity Manager Service (AMS) module, and skipping displaying the permission selection box;

an interception manner for the notification bar information is: modifying the NMS module, and directly deleting the notification bar information; and an interception manner for the floating window is: modifying a Window Manager Service (WMS) module, and setting a window of the floating window to be invisible.

2. The method according to claim 1 further comprising:

obtaining, when it is detected that a second application stops running, a package name of the second application;

obtaining a process name of the second application based on the package name of the second application;

obtaining a process record of the second application based on the process name of the second application; and restarting the second application based on the process record of the second application, and recording the package name of the second application into the silent application list after the second application is successfully started.

3. The method according to claim 2, wherein the obtaining, when it is detected that a second application stops running, a package name of the second application comprises:

detecting, when it is detected that the second application stops running, whether a CPU load of the terminal is less than a first preset threshold;

detecting whether effective memory of the terminal is greater than a second preset threshold; and obtaining the package name of the second application.

4. The method according to claim 2, wherein the obtaining a process name of the second application based on the package name of the second application comprises:

obtaining information about the second application based on the package name of the second application, wherein the information about the second application comprises: a version, a version number, a developer, and developer vendor information of the second application; and obtaining the process name of the second application based on the information about the second application.

5. A terminal device for silently starting an application in the background of a terminal, comprising a processor and a memory, wherein the processor is configured to:

monitor a run status of a plurality of applications on the terminal;

determine, when it is detected that a first application stops running, whether the first application is a silently started application; and intercept prompt information for the first application, wherein the silently started application is an application recorded in a silent application list; and the memory is configured to store the silent application list, wherein the prompt information for the first application comprises one or more of the following information: a Toast, a permission selection box, notification bar information, and a floating window; and the processor is configured to intercept different prompt information in the prompt information for the first application in different interception manners, wherein an interception manner for the Toast is: modifying a Notification Manager Service (NMS) module and skipping creating the Toast;

an interception manner for the permission selection box is: directly skipping an Activity Manager Service (AMS) module, and skipping displaying the permission selection box;

an interception manner for the notification bar information is: modifying the NMS module, and directly deleting the notification bar information; and an interception manner for the floating window is: modifying a Window Manager Service (WMS) module, and setting a window of the floating window to be invisible.

6. The terminal device according to claim 5, wherein the processor is further configured to obtain, when it is detected that a second application stops running, a package name of the second application;

obtain a process name of the second application based on the package name of the second application;

obtain a process record of the second application based on the process name of the second application; and restart the second application based on the process record of the second application, and record the package name of the second application into the silent application list after the second application is successfully started.

7. The terminal device according to claim 6, wherein the processor is further configured to: detect, when it is detected that the second application stops running, whether a CPU load of the terminal is less than a first preset threshold; detect whether effective memory of the terminal is greater than a second preset threshold; and obtain the package name of the second application.

8. The terminal device according to claim 6, wherein the processor is specifically configured to:

obtain information about the second application based on the package name of the second application, wherein the information about the second application comprises: a version, a version number, a developer, and developer vendor information of the second application; and obtain the process name of the second application based on the information about the second application.

9. A non-transitory storage medium, comprising instructions when performed by one or more processors implement:

monitor a run status of a plurality of applications on a terminal;

determine, when it is detected that a first application stops running, whether the first application is a silently started application;

intercept prompt information for the first application, wherein the silently started application is an application recorded in a silent application list, wherein the prompt information for the first application comprises one or more of the following information: a Toast, a permission selection box, notification bar information, and a floating window; and the processor is configured to intercept different prompt information in the prompt information for the first application in different interception manners, wherein an interception manner for the Toast is: modifying an Notification Manager Service (NMS) module and skipping creating the Toast;

an interception manner for the permission selection box is: directly skipping an Activity Manager Service (AMS) module, and skipping displaying the permission selection box;

an interception manner for the notification bar information is: modifying the NMS module, and directly deleting the notification bar information; and an interception manner for the floating window is: modifying a Window Manager Service (WMS) module, and setting a window of the floating window to be invisible.

* * * * *

UNITED STATES PATENT AND TRADEMARK OFFICE
CERTIFICATE OF CORRECTION

| | | |
|---|---|---|
| PATENT NO. | : 10,901,779 B2 | Page 1 of 1 |
| APPLICATION NO. | : 16/351011 | |
| DATED | : January 26, 2021 | |
| INVENTOR(S) | : Wen et al. | |

It is certified that error appears in the above-identified patent and that said Letters Patent is hereby corrected as shown below:

In the Claims

Claim 9, Column 18, Line 61: "Anon-transitory" should read -- A non-transitory --.

Signed and Sealed this
Ninth Day of August, 2022

Katherine Kelly Vidal
*Director of the United States Patent and Trademark Office*